T. HEERMANS.
Coffee Roaster.
No. 22,649.
Patented Jan. 18, 1859.
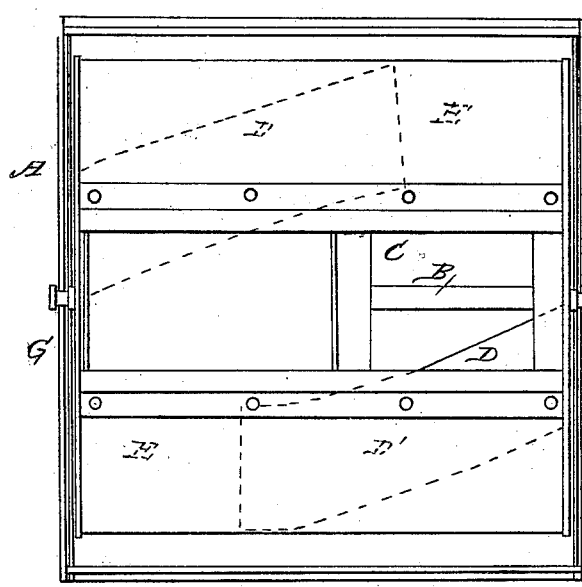
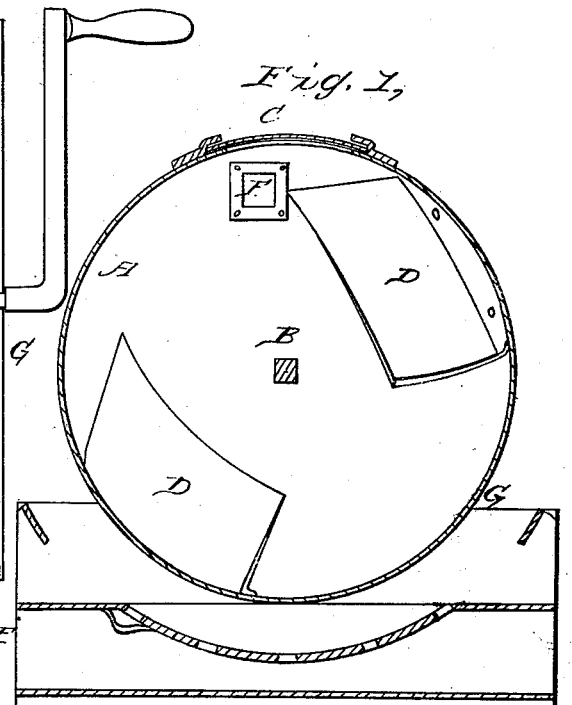
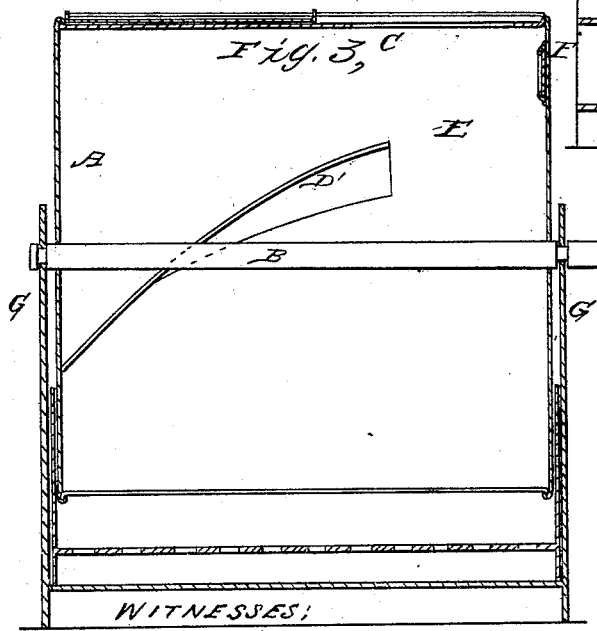

UNITED STATES PATENT OFFICE.

THEODORE HEERMANS, OF MITCHELLSVILLE, TENNESSEE.

COFFEE-ROASTER.

Specification forming part of Letters Patent No. 22,649, dated January 18, 1859; Reissued April 12, 1859, No. 691.

*To all whom it may concern:*

Be it known that I, THEODORE HEERMANS, of Mitchellsville, in the county of Sumner and State of Tennessee, have invented a new and useful Improvement in Coffee-Roasters; and I do hereby declare that the following is a full, clear, and exact description of the same, reference being had to the accompanying drawings, forming a part of this specification, in which—

Figure 1, is a vertical transverse section of a coffee roaster constructed with my improvements. Fig. 2, is a plan or top view of the same.

Similar letters of reference, in each of several figures indicate corresponding parts.

The present improvement which I desire to patent has the same object in view as that which is accomplished by the coffee roaster patented by me September 7th, 1858, to wit: the shifting of the position of the coffee at intervals and the thorough stirring up of the same, by the simple revolving of the cylinder and thus insuring a uniform roasting of all the grains.

The nature of my present invention consists 1st in the arrangement on the inner circumference of the revolving cylinder, of two plates or shelves, when said plates or shelves are placed on opposite sides of the cylinder and one runs from one end of the cylinder nearly to, or a short distance beyond the center of the cylinder's length in a line diagonal to the axis of the cylinder, and the other runs from the opposite end of the cylinder in a reverse direction and also in a line diagonal to the axis of the cylinder. By this arrangement, a space is left between the terminations of the shelves or plates and the ends or heads of the cylinder and two reverse inclined planes are formed, and consequently the coffee has a chance to come in contact with the whole surface of the cylinder and yet is picked up by the plates or shelves as the cylinder revolves and is shifted from one end of the cylinder to the other twice during each revolution of the cylinder, instead of only once as in my patent roaster of September 27, 1858; thus operating upon the coffee causes it to be very effectually agitated and stirred up and insures very uniform roasting.

My invention consists 2nd. in the combination of a window or windows, in one or both ends of the cylinder of a coffee roaster, with inclined agitating plates or shelves; whereby the condition of the coffee may be inspected without opening the door of the cylinder and thus the escape of the aroma of the coffee therefrom, avoided.

To enable others skilled in the art, to make and use my invention, I will proceed to describe its construction and operation.

A, represents the roasting cylinder. It is provided with a central axle B, on which it turns.

C, is a door formed in the circumference of the cylinder so as to introduce the coffee to be roasted.

D, D', are two shelves or plates projecting from the inner circumference of the cylinder. These plates run diagonally to the axis of the cylinder. The plate or shelf D, starting out from one end of the cylinder and terminating near the center of the length of the cylinder, and the plate or shelf D', starting out from the opposite end of the cylinder and running in a reverse direction to D, also in a line diagonal to the axis of the cylinder and terminating about the same as D', as represented in the drawing. By thus arranging the shelves, two reverse incline planes are formed and spaces E, E', are left between the ends of the cylinder and the terminating ends of the plates or shelves.

F, is a window in one end of the cylinder. It is formed of glass or other transparent material. This window is located in such relation to the upper end of the plate or shelf D, or the lower end of D', that when the coffee rises at said end of the plate or shelf, its condition may be inspected without opening the door C, and keeping the coffee at rest long enough to burn it, and thus the necessity of stopping the cylinder is avoided. It is also important to have the window F, for without it, much of the aroma of the coffee will be lost when the door is opened for the purpose of inspecting the coffee. The cylinder thus constructed is hung by the journals of its axle B, on a frame or support G, within which a fire box with perforated bottom is fitted so as to come directly under the cylinder and to be capable of sliding freely in and outward. Thus having the fire-box capable of sliding free of the frame or supports enables me to regulate the quantity of heat upon the cylinder, for by drawing it out a less amount of heat will strike directly upon the cylinder, and by forcing it in, a greater amount will come in contact with it.

The operation of the plates or shelves is as follows: As the cylinder revolves, the coffee is picked up by the plate D, or shelf and elevated, and when said plate or shelf stands over or nearly over the axle, the coffee descends on the incline plane and passes to the end of the cylinder from which position it is elevated by the plate or shelf D′, and when over or nearly over, the axle descends on the incline plane to the other end of the cylinder and thus the operation continues, the coffee being shifted from one end of the cylinder to the other at every half revolution of the cylinder.

What I claim as my invention and desire to secure by Letters Patent, is—

1. The within specified arrangement of the plates or shelves D, D′, for the purposes set forth.

2. The combination of a window or windows, in one or both ends of a coffee roaster, with inclined elevating plates or shelves, substantially as and for the purposes set forth.

THEO. HEERMANS.

Witnesses:
G. YORKE ATLEE,
B. W. FENWICK.

[FIRST PRINTED 1911.]